US008244416B2

(12) United States Patent
Fouet et al.

(10) Patent No.: US 8,244,416 B2
(45) Date of Patent: Aug. 14, 2012

(54) PROCESS FOR EVALUATING AN ERROR IN THE POSITIONING OF AN AIRCRAFT GENERATED FOR AN ON-BOARD POSITIONING SYSTEM

(75) Inventors: Guillaume Fouet, Leguevin (FR);
Xavier Grossin, Tournefeuille (FR);
Sébastien Robert, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 150 days.

(21) Appl. No.: 12/825,535

(22) Filed: Jun. 29, 2010

(65) Prior Publication Data
US 2011/0004402 A1     Jan. 6, 2011

(30) Foreign Application Priority Data

Jul. 3, 2009   (FR) ...................................... 09 03265

(51) Int. Cl.
*G01C 23/00*   (2006.01)
(52) U.S. Cl. .......................................................... 701/3
(58) Field of Classification Search ............... 701/3, 120, 701/408, 412, 468, 473, 534, 541
See application file for complete search history.

(56) References Cited

U.S. PATENT DOCUMENTS

| | | | |
|---|---|---|---|
| 3,988,734 A * | 10/1976 | Elwood .......................... | 342/464 |
| 6,512,976 B1 | 1/2003 | Sabatino et al. | |
| 2004/0015274 A1 * | 1/2004 | Wilkins et al. .................... | 701/3 |

FOREIGN PATENT DOCUMENTS

EP     1860456     11/2007

OTHER PUBLICATIONS

Kakarlapudi, et al., "The Application of Image Analysis Techniques to Forward Looking Terrain Database Integrity Monitoring", Digital Avionics Systems Conf., IEEE, Oct. 2004.

* cited by examiner

*Primary Examiner* — Kim T Nguyen
(74) *Attorney, Agent, or Firm* — Novak Druce + Quigg LLP

(57) ABSTRACT

A process for evaluating an error in the aircraft positioning as generated by an on-board positioning system is disclosed. The aircraft positioning as generated by the positioning system is recorded through radar means, the presence of at least one group of targets arranged on the ground is detected through said radar means, the position of such a group of targets is measured through said radar means with respect to the aircraft positioning, and the error in the aircraft positioning is evaluated, comparing with at least one threshold value the value of at least one reference magnitude being characteristic of the difference existing between the measured position and a known position of the group of targets with respect to the aircraft positioning.

8 Claims, 2 Drawing Sheets

PROCESS FOR EVALUATING AN ERROR IN THE POSITIONING OF AN AIRCRAFT GENERATED FOR AN ON-BOARD POSITIONING SYSTEM

CROSS-REFERENCE TO RELATED APPLICATIONS

This application claims priority to French Patent Application 0903265, filed Jul. 3, 2009, the entire contents of which are incorporated herein by reference.

FIELD OF THE INVENTION

The present invention relates to a process for evaluating an error in the positioning of an aircraft generated by a positioning system on-board the aircraft, and a device for implementing such a process.

BACKGROUND OF THE INVENTION

This invention more particularly applies, although not exclusively, to a satellite positioning system, such as the GPS positioning system ('Global Positioning System').

It is known that the GPS positioning system enables to supply relatively reliable and accurate information on the aircraft positioning.

However, studies showed that using the GPS positioning system by the pilot as a sole source of positioning for the aircraft could result in incidents and sometimes in accidents for the aircraft.

It is found, indeed, that the accuracy of the calculation as implemented in the GPS positioning system and generating the aircraft positioning could be reduced temporarily upon aircraft navigation in flight and that this accuracy defect could result in the pilot taking the wrong decisions because of the erroneous indication of the positioning.

A bad transmission of the signals sent by satellites and/or a bad reception of such signals by the aircraft disrupt(s) or disturb(s) the continuity of the calculation as implemented in the GPS positioning system, likely to result in such an accuracy defect.

A number of situations is known wherein the transmission and/or the reception of signals between the satellites and the aircraft are damaged, in particular:

unfavourable weather conditions, for instance, a high cloud cover, a storm or a strong humidity;

a radioelectric interference;

an obstacle interposed between the aircraft and the satellites.

Furthermore, other events could reduce the accuracy in the calculation of the GPS positioning system, such as an incident on a satellite or a temporary alignment of satellites resulting in a temporary geometrical uncertainty.

Thus, it would be advantageous to be able to evaluate the error on the positioning generated by the GPS positioning system, in order to allow for the pilot to know whether the aircraft positioning reported by such a GPS positioning system has a high accuracy level and this, on a permanent basis.

SUMMARY OF THE INVENTION

The present invention aims at meeting such requirements and provides a process for evaluating an error in the aircraft positioning generated by an on-board positioning system.

To this end, the process according to this invention is remarkable in that, automatically:

the aircraft positioning generated by the positioning system is recorded;

radar means detect the presence of at least one group of targets arranged on the ground and, through said radar means, the position thereof is measured, with respect to the aircraft positioning; and the error of the aircraft positioning is evaluated, comparing, with at least one threshold value, the value of at least one reference magnitude being characteristic of the difference existing between the measured position and a known position of the group of targets with respect to the aircraft positioning.

Thus, the process according to this invention enables to evaluate, in an accurate way, an error of the aircraft positioning generated by the positioning system. Such an evaluation allows the pilots to take the appropriate decisions being adapted for the thus evaluated accuracy level.

Advantageously, when said reference magnitude is lower than or equal to the threshold value, the aircraft positioning is used as generated by the positioning system at least for the aircraft navigation or for implementing any other function requiring an accurate position. When said reference magnitude exceeds said threshold value, the aircraft positioning being generated by the positioning system is corrected, taking into account said error of the positioning and the new positioning is used.

In a preferred embodiment:

on a screen of the aircraft, the measured position of the group of targets is displayed with respect to the aircraft positioning;

on the screen the known position of the group of targets is displayed with respect to the aircraft positioning; and the error of the aircraft positioning being generated by the positioning system is evaluated comparing on the screen the measured position and the known position of the group of targets.

Advantageously, several groups of targets are detected and one group of targets is selected amongst the thus detected groups of targets. Such a selection could automatically or manually occur.

For detecting the presence of the group of targets, vectors are determined with respect to the aircraft from intensity maxima of return signals, received and measured by radar means, and it is checked whether the geometrical shape implemented by such vectors corresponds to the particular geometrical shape of said group of targets.

Preferably, evaluating the positioning error automatically occurs when the aircraft is located in a detection area for the group of targets.

Still advantageously, the group of targets is arranged according to a particular geometrical shape being adapted for detection by the radar means.

The present invention further relates to a device for evaluating an error in the aircraft positioning generated by an on-board positioning system.

The device according to this invention is remarkable in that it comprises:

said positioning system;

radar means for detecting the presence of at least one group of targets arranged on the ground and for measuring the position thereof with respect to the aircraft positioning; and calculation means for evaluating the error in the aircraft positioning, such calculation means being coupled to the positioning system and to the radar means determining and comparing, with at least one threshold value, the value of at least one reference magnitude being characteristic of the difference existing between the measured position and the known position of the group of targets with respect to the aircraft positioning.

Advantageously said device further comprises means for correcting the aircraft positioning taking into account the evaluation of the error of positioning and means for signaling to the pilot the error in the aircraft positioning.

The present invention also relates to an aircraft provided with such a device.

BRIEF DESCRIPTION OF THE DRAWINGS

The figures of the appended drawing will better explain how this invention can be implemented. In these figures, like reference numerals relate to like components FIG. 1 schematically illustrates an embodiment of a device according to this invention.

DETAILED DESCRIPTION

Figure 1:
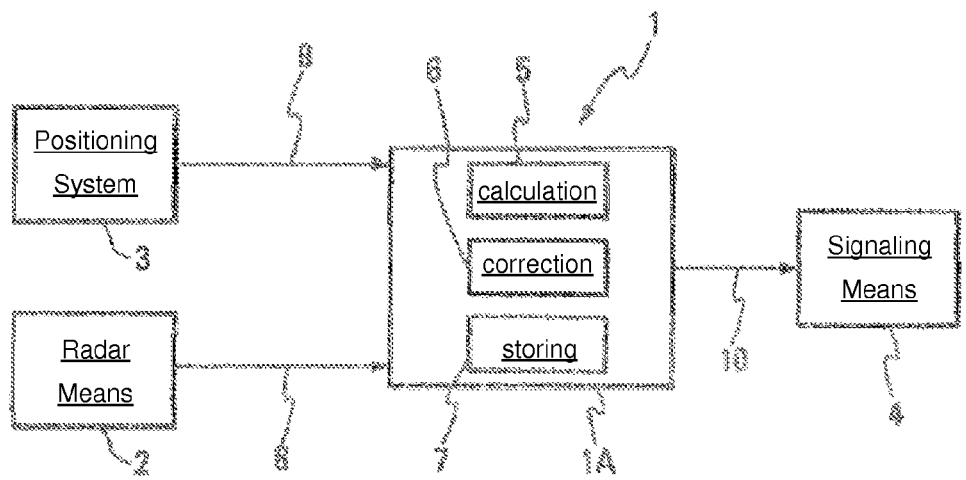

Referring to FIG. 1, the device according to this invention 1 comprises an electronic control unit 1A (ECU) connected upstream to radar means 2 and a positioning system 3, and downstream to signaling means 4.

The radar means 2 detect the presence of at least one group of targets arranged on the ground and measure the position thereof with respect to the aircraft positioning, generated by the positioning system 3 being a satellite positioning system, such as the GPS positioning system. The signaling means 4 enable to warn the pilot of an error in the positioning and to indicate a new corrected positioning.

The electronic control unit 1A comprises calculation means 5, correction means 6 and storing means 7. The calculation means 5 have as a function to evaluate the error in the aircraft positioning and they are coupled to the positioning system 3 and to the radar means 2.

The operation of the device 1 is described below.

In a first step, the electronic control unit 1A receives at the input the electrical signals sent by the radar means 2 and transmitted via a link 8. Such signals indicate the detection and position of a group of targets. It also receives at the input the electrical signals sent by the positioning system 3 and transmitted via a link 9. Such signals indicate the aircraft positioning generated by the positioning system 3.

In a second step, it processes these electrical signals received via the calculation means 5, and evaluates the possible positioning error generated by the positioning system 3.

In a third step, the electronic control unit 1A sends at the outlet to the signaling means 4 the electrical signals transmitted via a link 10. These electrical signals indicate the possible positioning error and the new corrected positioning.

Figure 2:
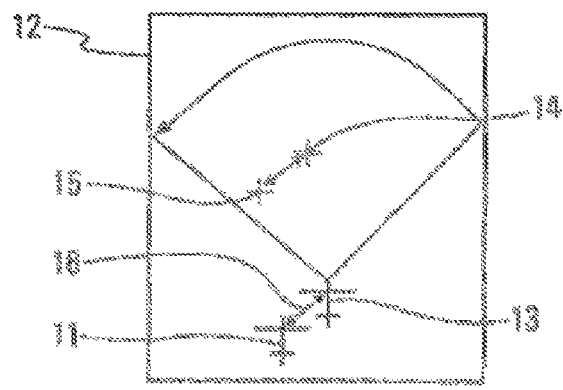
FIG. 2 schematically illustrates a screen enabling to visualize the process implemented by the device of FIG. 1.

As illustrated on FIG. 2, in a preferred embodiment, the process according to this invention comprises a set of steps, wherein:

through the electronic control unit 1A, the positioning 13 of the aircraft generated by the positioning system 3 is recorded, on a screen 12, being for example part of the signaling means 4, the so-called known position 14 on the ground of the group of targets is displayed, that it available with respect to the aircraft positioning 13. Such a known position 14 representing the true position of said group on the ground has been preliminarily recorded in the storing means 7;

through the radar means 2, the presence on the ground of the group of targets is detected, then through such radar means 2, the position 15 of the group of targets is measured, with respect to the positioning 13 of the aircraft, and such a position 15 is displayed on the screen 12; and an error 16 in the aircraft positioning 13 is evaluated, comparing on the screen 12 the measured position 15 and the known position 14 of the group of targets.

For evaluating with accuracy such an error 16 regarding the positioning 13, the calculation means 5 determine in a first step, the value of a reference magnitude being characteristic of the difference existing between the measured position 15 and the known position 14 of the group of targets with respect to the positioning 13. In a second step, the calculation means 5 compare the value of the reference magnitude with a threshold value.

In a first alternative embodiment of the process, the reference magnitude is the distance between the barycentre of the measured positions of the targets (of said group of targets) and the barycentre of the known positions of said targets with respect to the positioning 13.

In a second alternative embodiment of the process, said reference magnitude corresponds to the average of the individual distances between the measured positions and the known positions of the targets with respect to the positioning 13.

When said reference magnitude exceeds said threshold value, the correction means 6 correct the aircraft positioning 13 generated by the positioning system 3 taking into account said positioning error 16, and the new corrected position is displayed by the signaling means 4.

The reference magnitude could be another variable than those previously mentioned, the essential being that the value thereof enables to evaluate, with respect to a predetermined threshold value, the possible error 16 in the positioning 13 generated by the positioning system 3. It is also possible to define a first threshold value beyond which it is considered that there is no error 16 regarding the positioning 13 and that the EPU (Estimated Position Uncertainty) index is good, and a second threshold value higher than the first threshold value beyond which it is considered that there is an error 16 regarding the positioning 13 and that the EPU index is wrong. Between the two threshold values, it is considered that the value of the aircraft positioning 13 has some uncertainty and that the EPU index is an average. The signaling means 4 could also be sound.

Figures 3A, 3B, 3C:
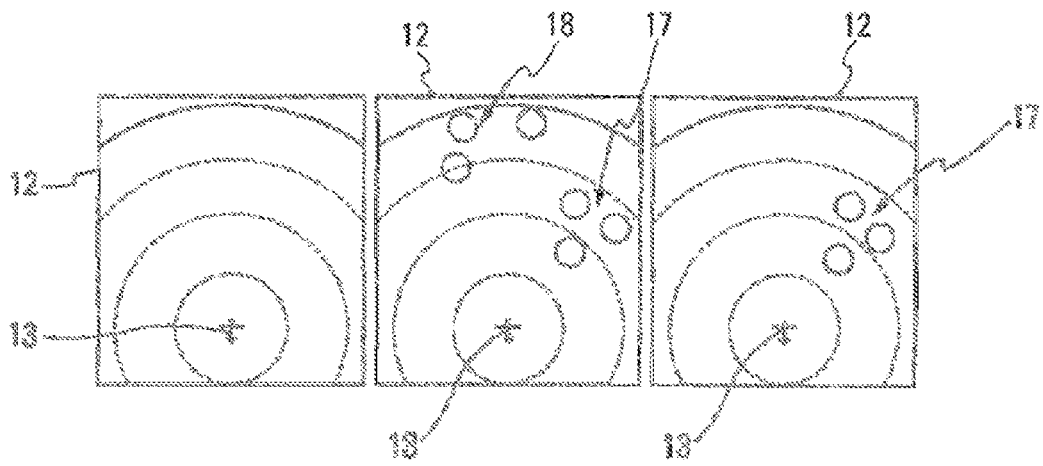
FIGS. 3a, 3b and 3c schematically show three consecutive images of the screen on FIG. 2.

FIGS. 3a to 3c illustrate a selecting step for the group of targets, according to the process implemented by the device 1.

On FIG. 3a, the radar means 2 have not detected any group of targets and the screen 12 is blank.

On FIG. 3b, the screen 12 displays two groups 17 and 18 of targets detected by the radar means 2.

On FIG. 3c, the pilot has manually selected the group 17 of targets.

Alternatively, selecting could be performed automatically by the device 1. Thus, the electronic control unit 1A could be activated automatically when the aircraft is located in a detection area for one of said groups 17 and 18 of targets. The detection area of a group 17, 18 of targets could be a circle centred on the barycentre of targets of this group 17 and 18 of targets and comprising a radius defining an area wherein the probability to detect the group of targets is, for example, 95%.

Advantageously, the radar means 2 perform two scans, which allows, when the group 17 of targets is not detected and that it should be detected considering the positioning 13, to confirm that the positioning 13 is wrong and that the group 17 of targets is not in the detection area.

The groups of targets are arranged on the ground according to a particular geometrical shape adapted for radar detection.

Figure 4:
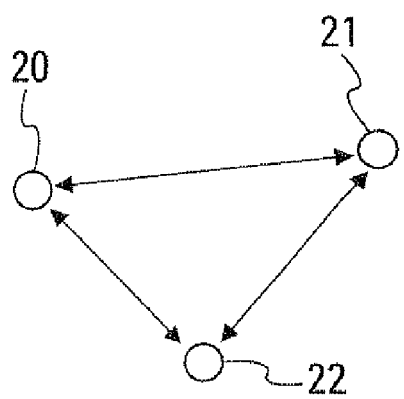
FIG. 4 illustrates a particular geometrical shape of a group of targets arranged on the ground and to be used for being detected by the radar means of the device of FIG. 1.

In a preferred embodiment, being illustrated on FIG. 4, the targets 20, 21 and 22 are arranged so as to form a triangle. The triangle provides for a reliable identification by the radar means 2, that is that the probability to detect another triangle that would pre-exist on the ground and that could have the same configuration as the triangle of the group of targets is low. Furthermore, simple angle changes between the targets 20, 21 and 22 allow several groups of targets to be differentiated.

The targets arranged on the ground must have a high reflectivity. For instance, a target comprises an equivalent radar surface (RCS) of 10,000 m$^2$ for being detected by the radar means 2 at a detection distance of 40 nautical miles (NM) with a detection probability of 95%. The location and the geometrical configuration of the targets make it possible to distinguish them from other ground elements. In one embodiment, these are radar reflectors having the shape of metallic balls or tetrahedron assemblies, allowing the signals emitted by the radar means 2 to be sent back homogeneously in all directions. In an alternative embodiment, they are elements projecting from the ground, such as buildings, plants, electric lines, providing for a satisfactory reflection of the signals emitted by the radar means 2.

Advantageously, the groups of targets are arranged in locations where the accurate aircraft positioning is to be known, for instance in the vicinity of airports, below busy air traffic lanes or in locations where the positioning systems have the lowest performance. The groups of targets could also be arranged along coasts so as to check the aircraft navigation after ocean crossings.

Figure 5:
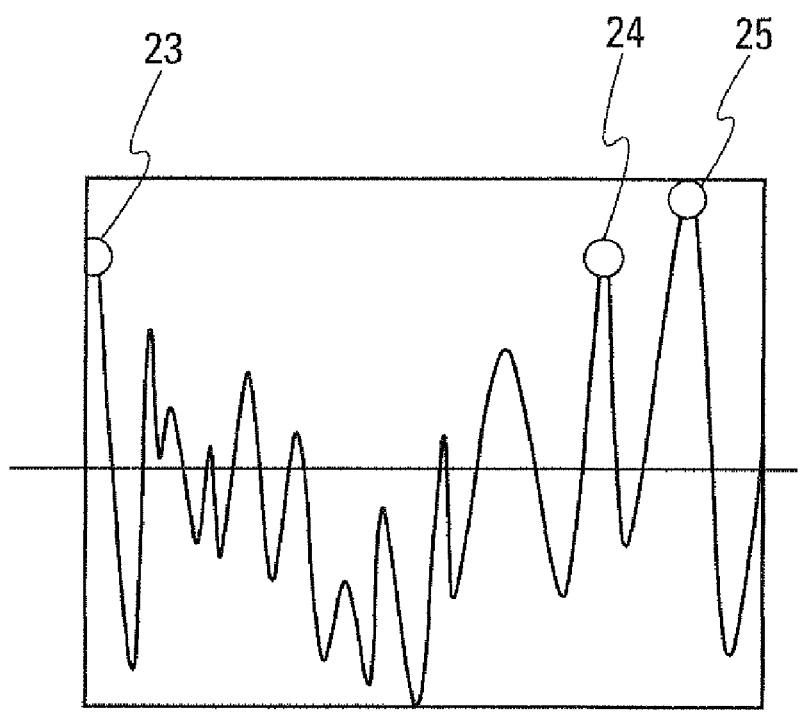
FIG. 5 schematically shows the intensity of the signals received by the radar means and illustrates the detection of the group of targets.

For detecting the presence of the group of targets, the calculation means 5 determine vectors with respect to the aircraft from the measured intensity maxima 23, 24 and 25 of the return signals issued from signals sent by the radar means 2 and reflected by the targets, as illustrated on FIG. 5. Then, the calculation means 5 check whether the geometrical shape achieved by such vectors corresponds to the geometrical shape of the known group of targets.

Thus, the device 1 according to this invention enables to perform, in a permanent and accurate way, an evaluation of the error 16 in the aircraft positioning 13 generated by the positioning system 3, and to correct it, if applicable, as a function of the position measured by the radar means 2. Said device 1 does not require adding new detection facilities, as it uses the on-board existing systems such as the radar means and the positioning system while coupling them.

The invention claimed is:

1. A process for evaluating an error (16) in an aircraft positioning (13) generated by an on-board positioning system (3), comprising automatically:
   recording the aircraft positioning (13) generated by the positioning system (3);
   detecting, through radar means (2), a presence of at least one group of targets (17, 18) arranged on the ground;
   measuring, through said radar means (2), the position (15) of said at least one group of targets (17, 18) with respect to the aircraft positioning (13); and
   evaluating the error (16) in the aircraft positioning (13), comparing with at least one threshold value, a value of at least one reference magnitude being characteristic of a difference existing between the measured position (15) and a known position (14) of the group of targets with respect to the aircraft positioning (13),
   wherein said group of targets (17, 18) is arranged according to a particular geometrical shape being adapted for a detection by the radar means (2), and in that, for detecting the presence of the group of targets (17, 18), vectors are determined with respect to the aircraft from intensity maxima (23, 24, 25) of return signals, received and measured by the radar means (2), and a check is performed to determine whether a geometrical shape achieved by such vectors corresponds to the particular geometrical shape of said group of targets (17, 18).

2. The process according to claim 1, wherein, when said reference magnitude is lower than or equal to the threshold value, the aircraft positioning (13) is used, as generated by the positioning system (3) at least for aircraft navigation.

3. The process according to claim 1, wherein, when said reference magnitude exceeds said threshold value, the aircraft positioning (13) generated by the positioning system (3) is corrected, taking into account said error (16) in the aircraft positioning (13).

4. The process according to claim 1, wherein:
   displaying, on a screen (12) of the aircraft, the measured position (15) of the group of targets is with respect to the aircraft positioning (13);
   displaying, on the screen (12) the known position (14) of the group of targets with respect to the aircraft positioning; and
   evaluating the error (16) in the aircraft positioning (13), as generated by the positioning system (3), comparing on the screen (12) the measured position (15) and the known position (14) of the group of targets.

5. The process according to claim 1, wherein several groups of targets (17, 18) are detected and a group of targets (17) is selected amongst the thus detected groups of targets (17, 18).

6. The process according to claim 1, wherein evaluating the error (16) in the aircraft positioning (13) is automatically performed when the aircraft is located in a detection area of the group of targets (17, 18).

7. A device for evaluating an error (16) in the aircraft positioning (13) as generated by an on-board positioning system (3), said device (1) comprising:
   said positioning system (3);
   radar means (2) for detecting a presence of at least one group of targets (17) arranged on the ground and for measuring a position (15) thereof with respect to the aircraft positioning (13); and
   calculation means (5) for evaluating the error (16) in the aircraft positioning (13), such calculation means (5) being coupled to the positioning system (3) and to the radar means (2), determining and comparing with at least one threshold value the value of at least one reference magnitude being characteristic of a difference existing between the measured position (15) and a known position (14) of the group of targets with respect to the aircraft positioning (13),
   wherein detecting the presence of the group of targets (17, 18) being arranged according to a particular geometrical shape being adapted for a detection by the radar means (2), said device (1) determines vectors with respect to the aircraft from intensity maxima (23, 24, 25) of return signals, received and measured by said radar means (2), and said device checks whether the geometrical shape achieved by such vectors corresponds to the particular geometrical shape of said group of targets (17, 18).

8. The device according to claim 7, further comprising means for correcting the aircraft positioning (13), taking into account the positioning error (16) and means (4) for signaling to a pilot the error (16) in the aircraft positioning (13).

* * * * *